Feb. 6, 1923.

E. KEMP.
VEHICLE WHEEL.
FILED MAY 17, 1919.

1,444,508.

Inventor
Edward Kemp.
By
Stanley Lightfoot
Attorney

Patented Feb. 6, 1923.

1,444,508

UNITED STATES PATENT OFFICE.

EDWARD KEMP, OF TORONTO, ONTARIO, CANADA, ASSIGNOR, BY DIRECT AND MESNE ASSIGNMENTS, OF ONE-THIRD TO GEORGE WHITAKER MORLEY AND ONE-THIRD TO CHARLES HEBER RUGGLES, BOTH OF TORONTO, ONTARIO, CANADA.

VEHICLE WHEEL.

Application filed May 17, 1919. Serial No. 297,846.

*To all whom it may concern:*

Be it known that I, EDWARD KEMP, of the city of Toronto, in the county of York, in the Province of Ontario, in the Dominion of Canada, have invented certain new and useful Improvements in Vehicle Wheels, and do hereby declare that the following is a full, clear, and exact description of same.

This invention relates to a novel method of constructing and assembling the spokes, felloe and rim of a wheel, being particularly applicable to the construction of an all-metal wheel having a hollow metal felloe, its objects being to secure simplicity in construction and assembling and durability in the assembled structure.

Further objects subsidiary to or resulting from the aforesaid objects, or from the construction or operation of the invention as it may be carried into effect, will become apparent as the said invention is hereinafter further disclosed.

In carrying the said invention into effect, I may provide a hollow felloe having a channel formation the sides of which extend outwardly from the centre of the wheel and are adapted to support a circumferential band and a tire superimposed upon the said band, radially coincident orifices in the said felloe and said band permitting the passage therethrough of pins whereby such pins may be supported by said felloe and said band, said pins being of a length whereby, when in position, they project some little distance beyond the inner surface of the felloe and thereby are adapted to enter the outer ends of tubular spokes, and resilient means associated with the said spokes and the said felloe; all of which is more particularly described and ascertained, by way of example, in and by the following description of the accompanying drawing, in which:—

Figure 1:
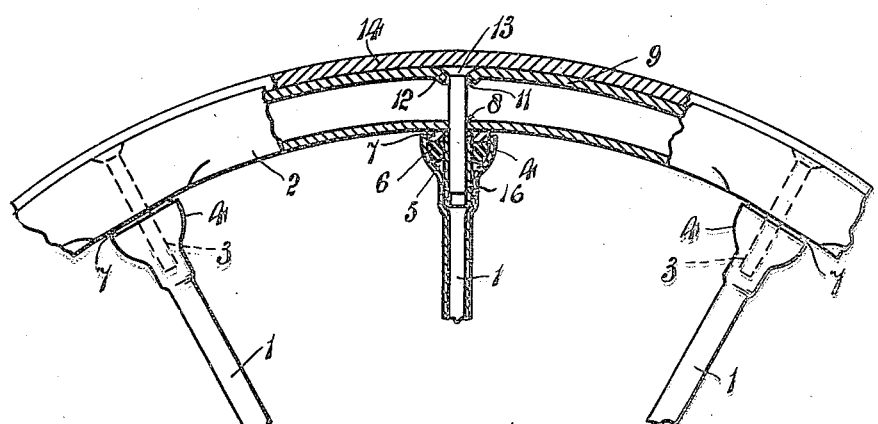
Figure 2:
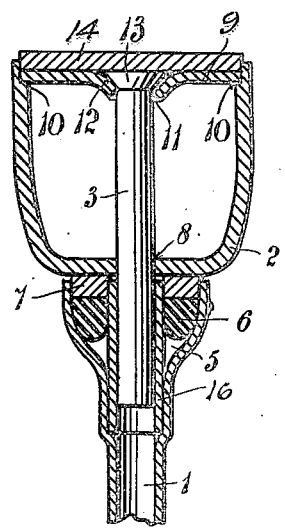

Figure 1 is a fragmentary elevation of the felloe of a wheel having spokes applied thereto embodying this invention, part of the felloe and one of the spokes being shown in section, and Figure 2 is a transverse section of such felloe and spoke construction, the said Figure 2 being drawn by a larger scale than is Figure 1.

Similar characters of reference indicate similar parts in both figures of the drawings.

The illustration is indicative of a construction which may be used advantageously in an all-metal wheel, 1, being tubular metal spokes, and 2 a hollow metal felloe, the latter being of channel configuration in cross section, the base of the channel forming the inner wall of the felloe.

The ends of the spokes are adapted to slidably receive the projecting ends of pins 3, extending radially, and inwardly, from the said felloe and they are cupped as at 4, to provide cushion compartments 5, in which are accommodated resilient insulating cushions 6, surmounted by closures, in the form of washers 7, slidable in the mouth of the said compartments 5. These closures bear against the base of the felloe and serve to transmit pressure of the said felloe to the said spokes, and vice-versa through the medium of the said cushions 6, whereby resiliency between the felloe and the spokes is obtained and shock to the wheel absorbed. The said closures also project the said cushions from access thereto of deleterious matter.

The base of the felloe is orificed, as at 8, to permit the passage of the pins therethrough and a support for the pins in the form of a metal or other strong and durable band 9 is shown, this band being lodged upon the shoulders 10, formed in the lateral walls of the hollow felloe; the said support for the pins being orificed as at 11, and counter-sunk as at 12, whereby the said pins may be passed through the orifices in the said support 9, and the heads 13 of the said pins 3 accommodated in the counter-sink of the supports, the further passage of the said pins through the said support being thereby checked.

The said pins are of such length that, when positioned in the orifices of the felloe, and of the support, their free ends extend substantially through the base of the said felloe and, in assembling, a spoke may be positioned with its end contiguous to one of the orifices 8 in the felloe, and a pin passed through the corresponding orifice 11 in the support, and through the said orifice 8 as far as the head of the pin will allow, the free end of the pin entering a hollow bushing 16 in the spoke and forming a slidable connection therewith between the said spoke and the felloe.

To prevent retraction of the pin after such assembling, securing means are provided therefor, and, in the example, such securing means are in the form of a steel or other desirable tire 14 superimposed upon the said support 9 and which may be set thereon or secured in the usual manner; the said tire enclosing the heads of the said pins, whereby the said pins are secured by the said tire against radial movement and secured, against angular movement, by the walls of the orifices 8 and 11.

The assembling of the spokes to the felloe of a wheel embodying this invention, such as in a wheel constructed in accordance with the example illustrated, may be easily effected and when once the securing member (in this case the tire) is positioned and affixed, a strong and durable connection between the spokes and the felloe is effected, and the parts forming such connection are enclosed and effectually protected from being tampered with or otherwise dislodged. The use of threaded connections may be entirely eliminated, reducing the cost of manufacture and time required for assembling, and a radially resilient joint between the spoke and the felloe, such as that described, is rendered possible without undue complication or sacrifice of strength in the wheel.

This invention may be developed within the scope of the following claims without departing from the essential features of the said invention and it is desired that the specification and drawing be read as being merely illustrative and not in a limiting sense, except as necessitated by the prior art.

What I claim as my invention is:—

1. In a wheel, a felloe, said felloe having a plurality of radial orifices therein, a plurality of spokes having their ends juxtaposed to said orifices, connecting means positioned in said orifices and slidably engaging the ends of said spokes, and means on said felloe locking said connecting means in their spoke engaging position.

2. In a wheel, a felloe, said felloe having a plurality of radial orifices therein, a plurality of spokes having tubular ends juxtaposed to said orifices, pins positioned in said orifices and slidably entering said spokes, and means on said felloe engaging the outer ends of said pins whereby said pins are locked against retraction from said spokes.

3. In a wheel, a felloe, said felloe having a plurality of radial orifices therein, a plurality of spokes having their ends juxtaposed to said orifices, connecting means positioned in said orifices and slidably engaging the ends of said spokes, a tire for said felloe, said tire locking said connecting means in their spoke engaging position, and resilient means at the outer ends of the spokes pressing against the felloe.

4. In a wheel, a felloe, said felloe having a plurality of radial orifices therein, a plurality of spokes having tubular ends juxtaposed to said orifices, pins positioned in said orifices and slidably entering said spokes, and a tire for said felloe, said tire engaging the outer ends of said pins whereby said pins are locked against retraction from said spokes.

5. In a wheel, a hollow felloe of channel configuration in cross section, said felloe having radial orifices in the base thereof, spoke-connecting means in said felloe, said connecting means projecting through said orifices, means within said felloe supporting the outer ends of said connecting means, and a tire forming a closure for said felloe, said tire locking said connecting means in position.

6. In a wheel, a hollow felloe of channel configuration in cross section, said felloe having radial orifices in the base thereof, spoke-connecting means in said felloe, said connecting means projecting through said orifices, means lodged in said felloe supporting the outer ends of said connecting means, and a tire forming a closure for said felloe, said tire locking said supporting means and said connecting means in position.

7. In a wheel, a hollow felloe of channel configuration in cross section, said felloe having radial orifices in the base thereof, pin-supporting means within said felloe, said pin-supporting means having orifices therein to correspond with the orifices in said felloe, spoke-connecting pins passing through the corresponding orifices in said felloe and said supporting means, whereby said pins are laterally supported both by said supporting means and said felloe, and means encompassing the outer ends of the pins locking said pins against radial displacement when in position, and spokes having sliding connection with the pins and resilient connection with the felloe.

8. In a wheel, a hollow felloe of channel configuration in cross section, said felloe having radial orifices in the base thereof, pin-supporting means within said felloe, said pin-supporting means having orifices therein to correspond with the orifices in said felloe, spoke-connecting pins passing through the corresponding orifices in said felloe and said supporting means, whereby said pins are laterally supported both by said supporting means and said felloe, and a tire forming a closure for said felloe, said tire locking said pins against radial displacement, and spokes having sliding connection with the pins and resilient connection with the felloe.

9. In a wheel, a hollow felloe of channel configuration in cross section, said felloe having radial orifices in the base thereof, pin-supporting means lodged within said felloe, said means having orifices therein to correspond with the orifices in said felloe, spoke-connecting pins passing through the corresponding orifices in said felloe and said supporting means, whereby said pins are laterally supported both by said supporting means and said felloe, and a tire forming a closure for said felloe, said tire locking said supporting means and said pins in position, and spokes having sliding connection with the pins and resilient connection with the felloe.

Signed at the city of Toronto, in the county of York, in the Province of Ontario, in the Dominion of Canada, this 22nd Day of April, 1919.

EDWARD KEMP.